United States Patent
Payne et al.

(10) Patent No.: US 6,977,755 B2
(45) Date of Patent: Dec. 20, 2005

(54) TONER ADVISOR APPARATUS AND METHOD

(75) Inventors: David M. Payne, Star, ID (US); Tim M. Hoberock, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 09/957,338

(22) Filed: Sep. 20, 2001

(65) Prior Publication Data

US 2003/0053117 A1    Mar. 20, 2003

(51) Int. Cl.$^7$ ............ H04N 1/60; H04N 1/52; G06K 15/14
(52) U.S. Cl. .......... 358/1.9; 358/518; 399/28; 399/39
(58) Field of Search .......... 358/1.9, 2.1, 501, 358/502, 503, 505, 514, 518, 530, 540, 3.24; 399/27, 26, 24, 111, 28, 39, 41, 54, 228; 347/19, 347/115

(56) References Cited

U.S. PATENT DOCUMENTS

| | | | |
|---|---|---|---|
| 3,739,800 A * | 6/1973 | Aasen et al. ............ 137/93 |
| 5,365,312 A | 11/1994 | Hillmann | |
| 5,655,174 A * | 8/1997 | Hirst .................... 399/27 |
| 5,794,094 A * | 8/1998 | Boockholdt et al. ..... 399/27 |
| 5,815,768 A * | 9/1998 | Clifton ................ 399/27 |
| 5,970,275 A * | 10/1999 | Brown et al. .......... 399/27 |
| 6,040,927 A | 3/2000 | Winter | |
| 6,196,663 B1 * | 3/2001 | Wetchler et al. ....... 347/43 |
| 6,253,035 B1 * | 6/2001 | Kawana et al. ........ 399/24 |
| 6,285,839 B1 * | 9/2001 | Tanaka et al. ........ 399/49 |
| 6,456,802 B1 * | 9/2002 | Phillips ............... 399/27 |
| 6,476,837 B2 * | 11/2002 | Ogata ............... 347/140 |
| 6,510,292 B1 * | 1/2003 | Owen et al. .......... 399/27 |
| 6,527,366 B1 * | 3/2003 | Byers et al. .......... 347/19 |
| 6,738,587 B1 * | 5/2004 | Hoene et al. ........ 358/1.14 |
| 2002/0163570 A1 * | 11/2002 | Phillips ............. 347/224 |
| 2003/0053102 A1 * | 3/2003 | Kelsey ............. 358/1.13 |
| 2003/0164987 A1 * | 9/2003 | Enomoto et al. ..... 358/400 |
| 2003/0164988 A1 * | 9/2003 | Enomoto et al. ..... 358/1.15 |
| 2005/0031367 A1 * | 2/2005 | Fukaya ............ 399/85 |

FOREIGN PATENT DOCUMENTS

| | | | |
|---|---|---|---|
| DE | 102 19 624 | 7/2001 | |
| EP | 0 0 684 135 | 11/1995 | |
| JP | 2005007852 A | * 1/2005 | ............ B41J 2/21 |

* cited by examiner

*Primary Examiner*—Scott A. Rogers

(57) ABSTRACT

A toner advisor apparatus and method for imaging systems includes an imaging device with a toner cartridge. More than one toner compartment in the toner cartridge is conformed to hold various toner colors. A cartridge scanner device is connected to the imaging system for scanning the more than one toner compartment. An analysis device is connected to the cartridge scanner device and to the imaging device for comparing the type of color required for a print job on the imaging device and the amounts of toner in the more than one toner compartment and for suggesting colors that optimize toner consumption. In one aspect of the invention, the analysis device is conformed to optimize toner consumption by suggesting colors that use nearly equal amounts of different toner colors over time.

29 Claims, 3 Drawing Sheets

TONER ADVISOR APPARATUS AND METHOD

FIELD OF THE INVENTION

This invention relates to a toner advisor apparatus and method. In particular, this invention relates to a toner advisor apparatus and method for imaging systems whereby the type of color required for a print job on an imaging device and the amounts of toner in the imaging device are compared and colors are suggested that optimize toner consumption.

BACKGROUND OF THE INVENTION

As office machines evolve over time, they offer more and more conveniences to the user. Printers are no exception. From automated typewriters, to inkjet printers, to laser printers, printers are far more capable today than earlier versions of even a year or two ago. One particular improvement in printers is the advent of color printers. Color printers have opened a wide range of applications to businesses allowing users to print color print jobs directly from the user's computer terminal by sending a print command to the printer. No expensive color printing processing is required.

Printers that are capable of printing colors range in cost from printers with dedicated individualized color toner compartments that may be individually removed and replaced, to much less expensive color printers that utilize multi-chambered cartridges holding a variety of toner colors. While the multi-chambered cartridges are cheaper, a difficulty arises in their use. This difficulty is that printers that use such multi-chambered cartridges always have one color used up completely before the other colors have been optimally used. This renders the unused colors, and hence the entire color cartridge, useless for most color purposes. Further, the typical response is to simply replace a cartridge when one of the colors is empty. This is a costly solution and a waste of unused toner colors.

Another prior art solution to the problem is to manually note the lowest color in a multi-chambered cartridge and try to avoid its use. Obviously, a real disadvantage of this process is that it is difficult and time consuming for most users to learn how to inspect the cartridge and to determine what specific color is lowest from such an inspection. A further disadvantage of this process is that even if they determine which color is low, most users are unable to determine what colors may be achieved by using combinations of the primary cartridge colors that do remain in the multi-chambered cartridge.

Thus, there is a need in the art for providing a toner advisor apparatus and method that enables a user of imaging devices to maximize toner usage over time.

SUMMARY OF THE INVENTION

Accordingly, the toner advisor apparatus and method of the present invention includes an imaging device with a toner cartridge. More than one toner compartment in the toner cartridge is conformed to hold various toner colors. A cartridge scanner device for scanning the more than one toner compartment is connected to the imaging device. An analysis device is connected to the cartridge scanner device and to the imaging device for comparing the type of color required for a print job on the imaging device and the amounts of toner in the more than one toner compartment and for suggesting colors that optimize toner consumption.

In a further aspect of the invention, a manual override is connected to the analysis device. In another aspect of the invention, an automatic mode is provided whereby the analysis device automatically directs the usage of colors that optimize toner consumption. In a further aspect of the invention, the analysis device is conformed to optimize toner consumption by suggesting colors that use nearly equal amounts of different toner colors over time.

In other aspects of the invention, the imaging device is an inkjet printer or a laser printer. In a further aspect of the invention, the analysis device for suggesting colors includes a user interface on the imaging device In another preferred embodiment of the invention, the apparatus includes a network of computers and printers. In this embodiment, a computer for processing data and preparing print jobs of processed data is connected by a network to a printer. The printer includes a color toner cartridge with more than one compartment conformed to hold a plurality of toner colors. A toner cartridge scanner is connected to the printer and is conformed to scan the more than one compartment and to determine what amount of toner color is in each of the compartments. An analyzer is connected to the toner cartridge scanner and to the printer and is conformed to receive print job commands from the computer and compare the color requirements of the print job with the amount of color left in the printer compartments and to suggest color combinations for the print job that optimize toner consumption.

In another preferred embodiment of the invention, in an imaging device, a method of advising a user of toner status and optimum toner use options includes the step of providing an imaging device with a toner cartridge. The toner cartridge is conformed to include more than one toner compartment holding various toner colors. A toner cartridge scanner is provided for scanning the more than one toner compartment. An analysis device is connected to the toner cartridge scanner and to the imaging device for comparing the type of color required for a print job on the imaging device and the amounts of various toner colors in the more than one toner compartment and for suggesting colors that optimize toner consumption. Next, the toner cartridge is scanned, a print job is sent to the imaging device, and the analysis device is used to compare the color required by the print job and the amounts of various toner colors remaining in the more than one toner compartment and to suggest colors that optimize color consumption.

In yet another preferred embodiment of the invention, in a network of computers for processing data and sending print jobs to printers and printers with multiple toner cartridge compartments for holding various toner colors, a computer program product for a toner advisor is provided, the computer program product including instructions for a cartridge scanner for scanning the multiple toner cartridge compartments and instructions for an analyzer for comparing the type of color required for a print job and the amounts of toner in the multiple toner compartments and for suggesting colors that optimize toner consumption.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
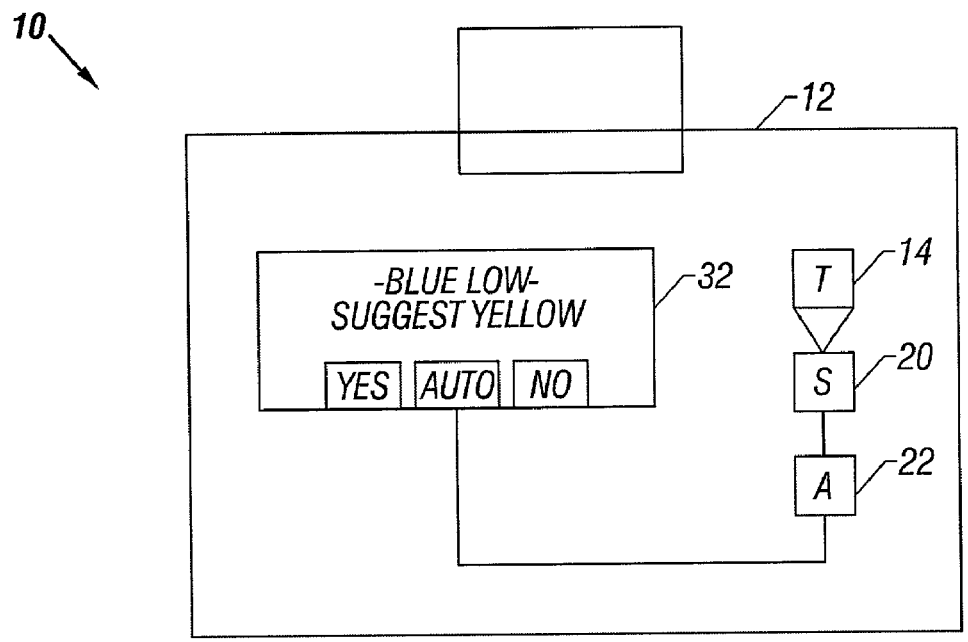
FIG. 1 is a schematic diagram of the toner advisor apparatus of the present invention.
Figure 2:
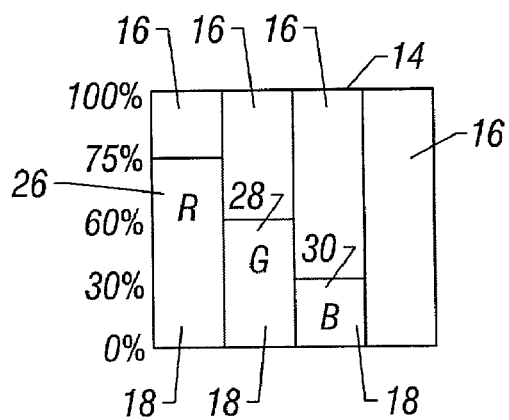
FIG. 2 is a front view of a toner cartridge with more than one toner compartment.

The preferred embodiment of the present invention is illustrated by way of example in FIGS. 1 through 6. With specific reference to FIG. 1, the toner advisor apparatus 10 of the present invention includes an imaging device 12 with a toner cartridge 14. As illustrated in FIG. 2, toner cartridge 14 includes more than one compartment 16 for holding a variety of colored toner 18.

A cartridge scanner 20 is connected to imaging device 12 for scanning toner cartridge 14 and determining the amount of colored toner 18 in the more than one compartments 16. An analysis device 22 is connected to the cartridge scanner 20 and to the imaging device 12 for comparing the type of color required for a print job on the imaging device 12 and the amounts of colored toner 18 in the more than one toner compartment 16 and for suggesting colors that optimize toner consumption.

The analysis device is any hardware or software now known or hereafter developed wherein known color formulas are stored. In a preferred embodiment, analysis device 22 optimizes toner use by suggesting colors that minimize or eliminate use of a color that is low. For example, analysis device 22 may advise use of a combination of colors that results in a similar color to the original color, but which utilizes less of the low color. Or, analysis device 22 may advise a totally separate color than the original color in order to maximize color use.

Figure 3:
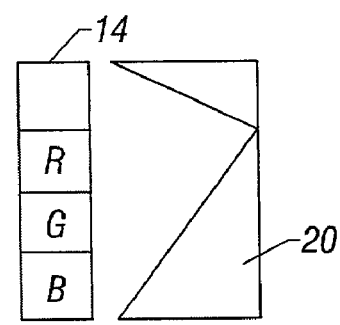
FIG. 3 is a side view of the toner cartridge in FIG. 2 and the cartridge scanner device of the present invention.

Referring now to FIGS. 2 and 3, toner cartridge 14 is shown in FIG. 3 in a front view which, in a preferred embodiment, is the "view" that cartridge scanner 20 has of toner cartridge 14 as illustrated in FIG. 3. FIG. 2 demonstrates a situation that occurs often in toner cartridges 14 with more than one compartment 16. As illustrated, one of the compartments 16 is an empty compartment 24 wherein all of the color toner 18 has been used of a particular color. The remainder of the compartments 16 hold varying amounts of colored toner 18. As illustrated, by way of example, compartment 26 holds approximately seventy-five (75%) percent of the full amount of red colored toner 18; compartment 28 holds approximately sixty (60%) percent of green colored toner 18; and compartment 30 holds approximately thirty (30%) percent of blue colored toner 18.

Referring now to FIG. 3, toner cartridge 14 is shown in side view with cartridge scanner 20 in position to scan each of the separate compartments 16. Cartridge scanner 20 in a preferred embodiment is any scanner device known in the art such as optical, electro optical and the like.

At least five scanners 20 are known in the art to these inventors. In one case, toner cartridge 14 has windows which are optically scanable. In another case, a voltage rod in the toner cartridge 14 is used to determine amounts of toner 18 remaining. In another case, scanner 20, in a laser jet application, uses two plates surrounding cartridge 14 to measure capacitance and thereby the volume of toner 18 remaining. In an ink jet application, sensor 20 is in the form of a timer for measuring the length of time a toner cartridge 14 has been used. In a desk jet application, scanner 20 is a pixel counter whereby the number of pixels produced is tracked and the amount of toner 18 remaining is extrapolated therefrom.

Figure 4:
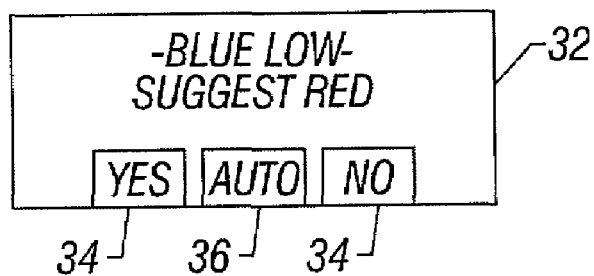
FIG. 4 is a close-up view of the user interface of the present invention.

Referring now to FIG. 4, another aspect of the toner advisor apparatus 10 is more fully disclosed. In this embodiment, a user interface 32 is provided whereby analysis device 22 prompts a user with suggested color options. Again, toner advisor apparatus 10 functions such that cartridge scanner 20 advises analysis device 22 of the relative amounts of colored toner 18 in toner cartridge 14. Analysis device 22 takes that information and combines it with incoming print job information received at imaging device 12. In one aspect of the invention, user interface 32 provides information to the user about what color is low, in this case FIG. 4 shows the data as "blue low". This toner capacity status is followed by a suggestion by analysis device 22 for printing the print job on imaging device 12 in a color more suitable to the limited capacity of toner cartridge 14. In FIG. 4, the suggestion is "suggest red".

In another aspect of the invention, toner advisor apparatus 10 includes manual override 34. As illustrated, manual override 34 consists of a "Yes" and "No" button. If the user accepts this suggestion, the user manually presses the Yes button. However, if the user does not accept a suggestion, the user presses the No button and manually overrides the suggestions such that the print job is printed in the originally requested color, assuming that color is available at all. In a further aspect of the invention, the user preselects autocontrol 36 whereby the analysis device 22 automatically oversees the use of each of the colors in toner cartridge 14 so as to optimize toner cartridge 14 toner consumption. In such case, the user cares that the printed job is in color but not any particular color.

Figure 5:
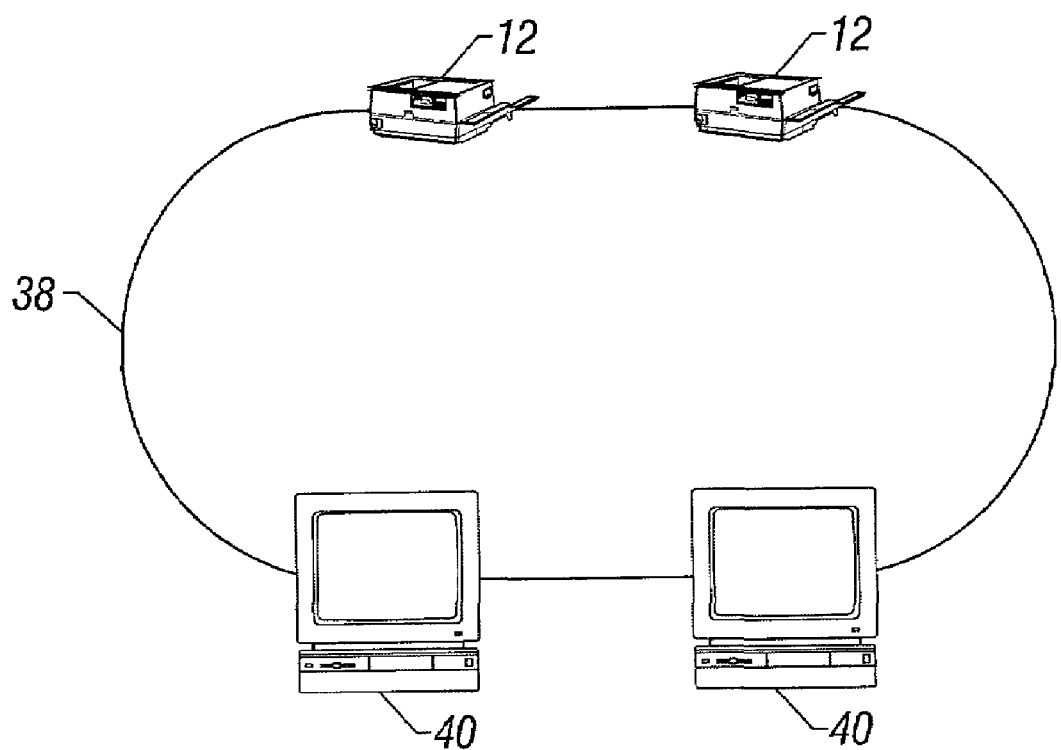
FIG. 5 is a schematic diagram of a network of computers and printers.

Referring now to FIG. 5, a preferred embodiment of the toner advisor apparatus 10 of the present invention is illustrated whereby a network 38 of computers 40 and imaging devices/printers 12 are interconnected. It is common for computers 40 to be located apart from printers 12 in that printers 12 are often distributed throughout the business at convenient locations. This makes toner advisor apparatus 10 even more useful when user interface 32 is located on computer 40 and, after sending the print command to printers 12, the user receives the suggestions from the analyzer 22 at his or her computer terminal. Obviously, computers 40 are any computer processors now known or hereafter developed for processing data and preparing print jobs of processed data. Further, while analysis device 22 is shown in FIG. 1as located on imaging device 12, both analyzer device 22 and user interface 32 may be located on remote computer 40 and connected to imaging device 12 by means of a network 38. Also, imaging device 12 may be any imaging device now known or hereafter developed such as, again, an inkjet or a laser printer.

Figure 6:
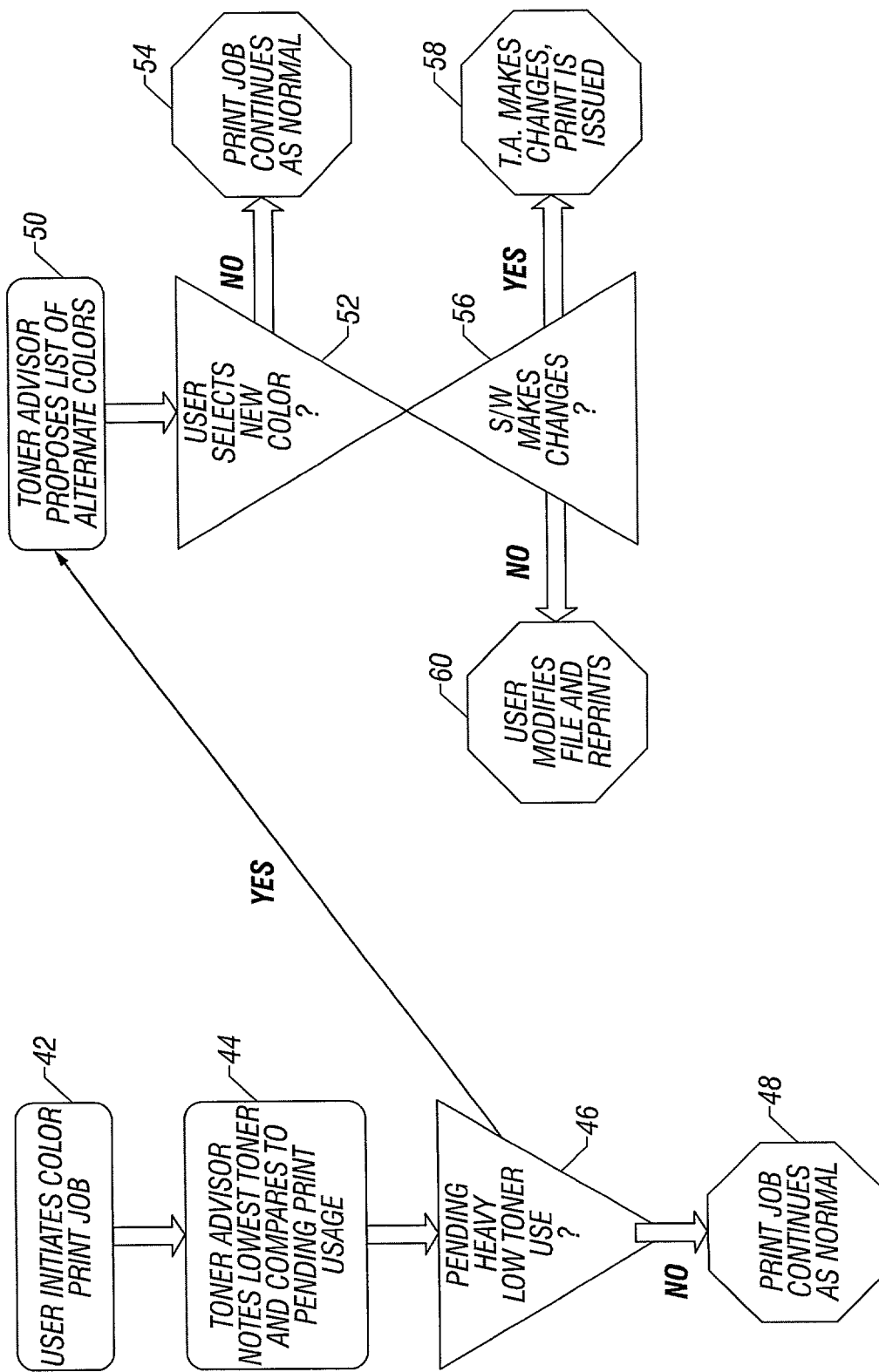
FIG. 6 is a flow diagram of the toner advisor of the present invention.

Referring now to FIG. 6, a flow diagram of the method of the invention is disclosed. For the purposes of this discussion, the flow diagram in FIG. 6 commences at block 42 wherein a user initiates a color print job, once again, typically from his or her desk at computer 40. In any event, after initiating the color print job in block 42, the toner advisor apparatus 10 of the present invention by means of cartridge scanner 20 and analysis device 22, as discussed above, notes the lowest toner and compares the toner availability to the pending print use in block 44. At that point, at block 46 the analysis device 22 answers the question whether the print job will result in a pending heavy low toner use. If not, the print job continues as normal in block 48. If yes, the toner advisor apparatus 10 of the invention proposes a list of alternate colors in block 50. In block 52 if the user does not select the new color, by using, for example, the manual override 34 No button, the print job continues as normal in block 54. In block 56, either the toner advisor apparatus 10 of the present invention utilizes software to automatically make the requested color changes as in block 58 or, the user modifies the file and reprints it as suggested in block 60. In either case, that is, in either block 58 or block 60, toner advisor apparatus 10 has served the purpose of the invention by optimizing the use of colored toner 18 from toner cartridge 14 thereby greatly expanding the life of toner cartridge 14. For the purposes of the invention, the term "toner" is meant to include any form of imaging material such as ink, wet and dry, and the like used for forming images.

The description of the present embodiments of the invention have been presented for purposes of illustration, but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which fall within the spirit and scope of the invention as defined by the following claims.

What is claimed is:

1. A toner advisor apparatus for imaging systems, the apparatus comprising:
    a) an imaging device with a toner cartridge;
    b) more than one toner compartment in said toner cartridge conformed to hold various toner colors;
    c) a cartridge scanner means connected to the imaging device for scanning said more than one toner compartment; and
    d) an analysis means connected to said cartridge scanner means and to said imaging device for comparing the type of color required for a print job on said imaging device and the amounts of toner in said more than one toner compartment and for suggesting colors that optimize toner consumption.

2. The apparatus of claim 1 further comprising a manual override connected to said analysis means.

3. The apparatus of claim 1 further comprising an automatic mode whereby said analysis means automatically directs the usage of colors that optimize toner consumption.

4. The apparatus of claim 1 wherein said imaging device is an inkjet printer.

5. The apparatus of claim 1 wherein said imaging device is a laser printer.

6. The apparatus of claim 1 wherein said analysis means is conformed to optimize toner consumption by suggesting colors that use nearly equal amounts of different toner colors over time.

7. The apparatus of claim 1 wherein the analysis means for suggesting colors includes a user interface on the imaging device.

8. The apparatus of claim 1 further comprising a computer connected to the imaging device wherein said analysis means is located on said computer and said computer includes a user interface with said imaging device.

9. In a network of computers and printers, a toner advisor for printers comprising:
    a) a computer for processing data and preparing print jobs of processed data;
    b) a network connected to said computer;
    c) a printer, connected to the network and thereby to the computer, for printing print jobs in color, said printer further comprising a color toner cartridge with more than one compartment conformed to hold a plurality of toner colors;
    d) a toner cartridge scanner connected to said printer conformed to scan said more than one compartment and to determine what amount of toner color is in each of said compartments; and
    e) an analyzer connected to said toner cartridge scanner and to said printer conformed to receive print job commands from said computer and compare the color requirements of the print job with the amount of color left in the printer compartments and to suggest color combinations for the print job that optimize toner consumption.

10. The apparatus of claim 9 further comprising a manual override connected to said analyzer.

11. The apparatus of claim 9 further comprising an automatic mode whereby said analyzer automatically directs the usage of colors that optimizes toner consumption.

12. The apparatus of claim 9 wherein said printer is an inkjet printer.

13. The apparatus of claim 9 wherein said printer is a laser printer.

14. The apparatus of claim 9 wherein said analyzer is conformed to optimize toner consumption by suggesting color combinations that use nearly equal amounts of different toner colors over time.

15. In an imaging device, a method of advising a user of toner status and optimum toner use options, the method comprising the steps of:
    a) providing an imaging device with a toner cartridge;
    b) conforming said toner cartridge to include more than one toner compartment holding various toner colors;
    c) providing a toner cartridge scanner for scanning said more than one toner compartment;
    d) connecting an analysis means to said toner cartridge scanner and to said imaging device for comparing the type of color required for a print job on said imaging device and the amounts of various toner colors in said more than one toner compartment and for suggesting colors that optimize toner consumption;
    e) scanning said toner cartridge;
    f) sending a print job to said imaging device; and
    g) using said analysis means to compare the color required by said print job and the amounts of various toner colors in said more than one toner compartment and to suggest colors that optimize toner consumption.

16. The method of claim 15 further comprising the step of adding a manual override connected to said analysis means.

17. The method of claim 15 further comprising the step of adding an automatic mode whereby said analysis means automatically directs the usage of colors that optimize toner consumption.

18. The method of claim 15 further comprising the step of conforming said analyzer means to optimize toner consumption by suggesting colors that use nearly equal amounts of different toner colors over time.

19. In a network of computers for processing data and sending print jobs to printers and printers with multiple toner cartridge compartments for holding a variety of toner colors, a computer program product for a toner advisor, the computer program product comprising:
    a) instructions for a cartridge scanner for scanning said multiple toner cartridge compartments; and b) instructions for an analyzer for comparing the type of color required for a print job and the amounts of toner in the multiple toner compartments and for suggesting colors that optimize toner consumption.

20. The computer program product of claim 19, further comprising instructions for said analyzer for optimizing toner consumption by suggesting colors that use nearly equal amounts of different toner colors over time.

21. A toner advisor, comprising:
 a cartridge scanner for use in at least indirectly detecting an amount of toner in each of a plurality of toner compartments provided by a toner cartridge; and
 an analyzer in communication with the cartridge scanner, the analyzer operable to compare the type of color required for a print job and the amounts of toner in the toner compartments and to suggest one or more alternate colors for producing the print job to help minimize or eliminate consumption from a toner compartment that is determined to be low.

22. The toner advisor of claim 21, further comprising a manual override operable to enable a user to not accept a color suggested by the analyzer.

23. The toner advisor of claim 21, further comprising an auto-control operable to enable the analyzer to automatically accept a color suggestion.

24. A method of advising a user of toner status and optimum toner use options, the method comprising the steps of:
 determining an amount of toner in each of a plurality of toner compartments provided by a toner cartridge;
 comparing the color required by a print job and the amounts of various colored toner colors in the toner compartments; and
 suggesting one or more alternate colors for use in producing the print job to help minimize or eliminate consumption from a toner compartment that is determined to be low.

25. The method of claim 24, further comprising, upon selection of a manual override control, not accepting a suggested color.

26. The method of claim 24, further comprising, upon selection of an auto control, automatically accepting a suggested color.

27. A computer readable medium having computer executable instructions for:
 determining an amount of toner in each of a plurality of toner compartments provided by a toner cartridge;
 comparing the color required by a print job and the amounts of various colored toner colors in the toner compartments; and
 suggesting one or more alternate colors for use in producing the print job to help minimize or eliminate consumption from a toner compartment that is determined to be low.

28. The medium of claim 27, having further instructions for, upon selection of a manual override control, not accepting a suggested color.

29. The medium of claim 27, having further instructions for, upon selection of an auto control, automatically accepting a suggested color.

* * * * *